United States Patent [19]

Neumann et al.

[11] Patent Number: 4,974,707
[45] Date of Patent: Dec. 4, 1990

[54] SHOCK ABSORBER

[75] Inventors: Helmut Neumann, Glinde; Werner Komossa, Börnsen, both of Fed. Rep. of Germany

[73] Assignee: Korber AG, Hamburg, Fed. Rep. of Germany

[21] Appl. No.: 428,458

[22] Filed: Oct. 30, 1989

Related U.S. Application Data

[63] Continuation of Ser. No. 254,191, Oct. 5, 1988, abandoned.

[30] Foreign Application Priority Data

Oct. 13, 1987 [DE] Fed. Rep. of Germany ....... 3734575
Mar. 22, 1988 [DE] Fed. Rep. of Germany ....... 3809532

[51] Int. Cl.$^5$ ............................................. F16F 9/34
[52] U.S. Cl. ................................. 188/299; 137/246;
137/599; 188/319; 188/322.15; 251/129.21;
280/714
[58] Field of Search .............. 188/282, 299, 320, 319,
188/322.13, 322.14, 322.15, 264.13; 137/599,
246; 251/129.21; 280/714

[56] References Cited

U.S. PATENT DOCUMENTS

| | | | |
|---|---|---|---|
| 1,926,790 | 9/1933 | Ploen | 137/246 X |
| 3,086,622 | 4/1963 | Schultze | 188/317 X |
| 3,419,113 | 12/1968 | Shelley | 188/282 X |
| 4,504,039 | 3/1985 | Akagi | 251/129.21 X |
| 4,620,619 | 11/1986 | Emura et al. | 188/282 X |
| 4,671,392 | 6/1987 | Wossner | 188/299 |
| 4,681,143 | 7/1987 | Sato et al. | 251/129.21 X |
| 4,696,379 | 9/1987 | Yamamoto et al. | 251/129.21 X |
| 4,726,453 | 2/1988 | Obstfelder et al. | 188/299 X |
| 4,749,069 | 6/1988 | Knecht et al. | 188/299 |
| 4,765,445 | 8/1988 | Komossa et al. | 188/299 |
| 4,800,995 | 1/1989 | Bernhardt et al. | 188/319 |
| 4,858,736 | 8/1989 | Arnaud et al. | 188/322.14 |

FOREIGN PATENT DOCUMENTS

| | | | |
|---|---|---|---|
| 3542097 | 6/1987 | Fed. Rep. of Germany | 188/282 |
| 3605182 | 8/1987 | Fed. Rep. of Germany | . |
| 725400 | 3/1955 | United Kingdom | 137/246 |
| 1363303 | 8/1974 | United Kingdom | 188/322.14 |

Primary Examiner—George E. A. Halvosa
Attorney, Agent, or Firm—Peter K. Kontler

[57] ABSTRACT

A shock absorber with a variable damping characteristic has a piston which is reciprocable in a cylinder to divide the oil-filled internal space of the cylinder into two chambers. The chambers are connectable to each other by one or more passages so that oil can flow between the chambers in response to movement of the piston relative to the cylinder and/or vice versa. The piston has several bypasses each of which is controlled by an adjustable electrically operated regulating valve. In order to enhance the accuracy of regulation of flow of oil between the chambers by way of the bypasses, the piston is formed with channels which supply oil between the mobile valving elements and the seats of the valves to thus reduce or eliminate friction between such parts. The films of oil between the valving elements and the respective seats from hydrostatic bearings which ensure that the valving elements can leave their open or closed positions, as well as that the valving elements can move between such positions, with a high degree of predictability and faster than in heretofore known regulating valves. The valving elements can be disposed one behind the other in the axial direction of the piston. Alternatively, at least one valving element can surround at least one other valving element. All valving elements can be mounted for movement relative to a single common seat.

9 Claims, 3 Drawing Sheets

SHOCK ABSORBER

CROSS-REFERENCE TO RELATED CASE

This is a continuation of commonly owned copending patent application Ser. No. 254,191 filed Oct. 5, 1988 for "Shock Absorber", now abandoned.

BACKGROUND OF THE INVENTION

The invention relates to improvements in shock absorbers in general, and more particularly to improvements in shock absorbers with variable damping characteristics. Such shock absorbers can be utilized with advantage in many types of vehicles.

Commonly owned copending patent application Ser. No. 031,252 filed Mar. 26, 1987 by Werner Komossa and Peter Brand, now U.S. Pat. No. 4,765,445 granted Aug. 23, 1988, and commonly owned German Offenlegungsschrift No. 36 05 182 of Dirk Wessel disclose shock absorbers wherein a cylinder contains a piston which divides the internal space of the cylinder into two chambers. The piston is reciprocable by a piston rod which extends through one end wall of the cylinder, and the piston has one or more passages for the flow of a damping fluid between the two chambers in response to axial movement of the piston rod relative to the cylinder and/or vice versa. In addition, the piston is formed with one or more bypasses and carries electrically operated valves which regulate the flow of damping fluid between the chambers by way of such bypasses.

The valving elements of the regulating valves slide relative to their seats and/or other parts of the respective valves with attendant generation of friction which can affect the accuracy and predictability of the damping operation. As a rule, the valving elements slide along cylindrical surfaces. It has been found that, when the pressure of damping fluid in the cylinder reaches a very high value, e.g., in the range of 50 bar, friction between the valving elements and the adjacent parts can adversely influence the reaction time of the valves. In other words, friction can adversely influence the timing of movement of valving elements from closed to open positions or vice versa as well as the speed of movement of the valving elements between such positions. The problem is aggravated as the pressure in the interior of the cylinder increases. In fact, elevated pressures can cause actual jamming of the valving elements so that the flow of damping fluid through the bypasses cannot be regulated at all.

OBJECTS OF THE INVENTION

An object of the invention is to provide a shock absorber wherein the regulating valve or valves for the flow of damping fluid through one or more bypasses are less affected by friction than in heretofore known shock absorbers.

Another object of the invention is to provide a novel and improved piston-piston rod assembly for use in the above outlined shock absorber.

A further object of the invention is to provide novel and improved valves for use in the above outlined shock absorber.

An additional object of the invention is to provide a shock absorber wherein the valve or valves which serve to regulate the flow of damping fluid between the chambers at opposite sides of the piston in the cylinder can react with a higher degree of predictability and more rapidly than in heretofore known shock absorbers with variable damping characteristics.

Still another object of the invention is to provide a shock absorber with regulating valves wherein friction between the mobile valving elements and their seats is not only less pronounced but also more predictable than in regulating valves which are employed in presently known shock absorbers with bypasses between the chambers at opposite sides of their pistons.

A further object of the invention is to provide a novel and improved method of enhancing the accuracy and reliability of shock absorbers with variable damping characteristics.

Another object of the invention is to provide a novel and improved valve seat for use in the above outlined shock absorber.

SUMMARY OF THE INVENTION

The invention resides in the provision of a shock absorber with a variable damping characteristic, particularly for use in vehicles. The improved shock absorber comprises at least one hollow cylinder defining an internal space for confinement of a damping fluid (e.g., oil) and having an internal surface and a first and a second end, and a piston-piston rod assembly which includes a piston rod sealingly extending through one end of the cylinder and into the internal space, and a piston which is disposed in and is in sealing engagement with the internal surface of the cylinder so as to divide the internal space into first and second chambers. The assembly has at least one passage for the flow of damping fluid between the two chambers in response to axial movement of the assembly relative to the cylinder and/or vice versa, and the assembly is further provided with at least one bypass which extends between the two chambers. The shock absorber further comprises means for regulating the flow of damping fluid through the bypass, including a valving element which is mounted in the assembly for movement relative to the bypass, and the assembly is further provided with means for supplying a lubricant (e.g., the damping fluid) between the valving element and the assembly to reduce or eliminate friction while the valving element is caused to move in order to alter the rate of flow of damping fluid through the bypass.

The piston-piston rod assembly can be provided with a plurality of bypasses and the regulating means can comprise a valving element for each bypass. The assembly is then provided with means for supplying a lubricant (such as the damping fluid) between the assembly and each of the valving elements. It is presently preferred to employ electrically operated regulating means.

The piston-piston rod assembly can include seat means for the valving elements, and the supplying means is then arranged to supply lubricant between such seat means and the valving elements. The seat means can include a single seat which is common to all valving elements. Such single seat can constitute a cylinder and can be provided with apertures for damping fluid. The apertures can include portions of the bypass or bypasses and/or portions of the supplying means.

If the shock absorber employs electrically operated regulating means, such regulating means preferably comprises an exciter coil for each valving element. Each exciter coil can concentrically surround the respective valving element. The valving elements of such regulating means are preferably concentric with each other. The arrangement may be such that the exciter coils are concentric with each other, with the valving elements and with the piston-piston rod assembly. Such valving elements can include an inner valving element and an outer valving element which concentrically surrounds the inner valving element. The at least one passage in the piston-piston rod assembly of such shock absorber can be disposed radially outwardly of the outer valving element, i.e., between the outer valving element and the internal surface of the cylinder.

The novel features which are considered as characteristic of the invention are set forth in particular in the appended claims. The improved shock absorber itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
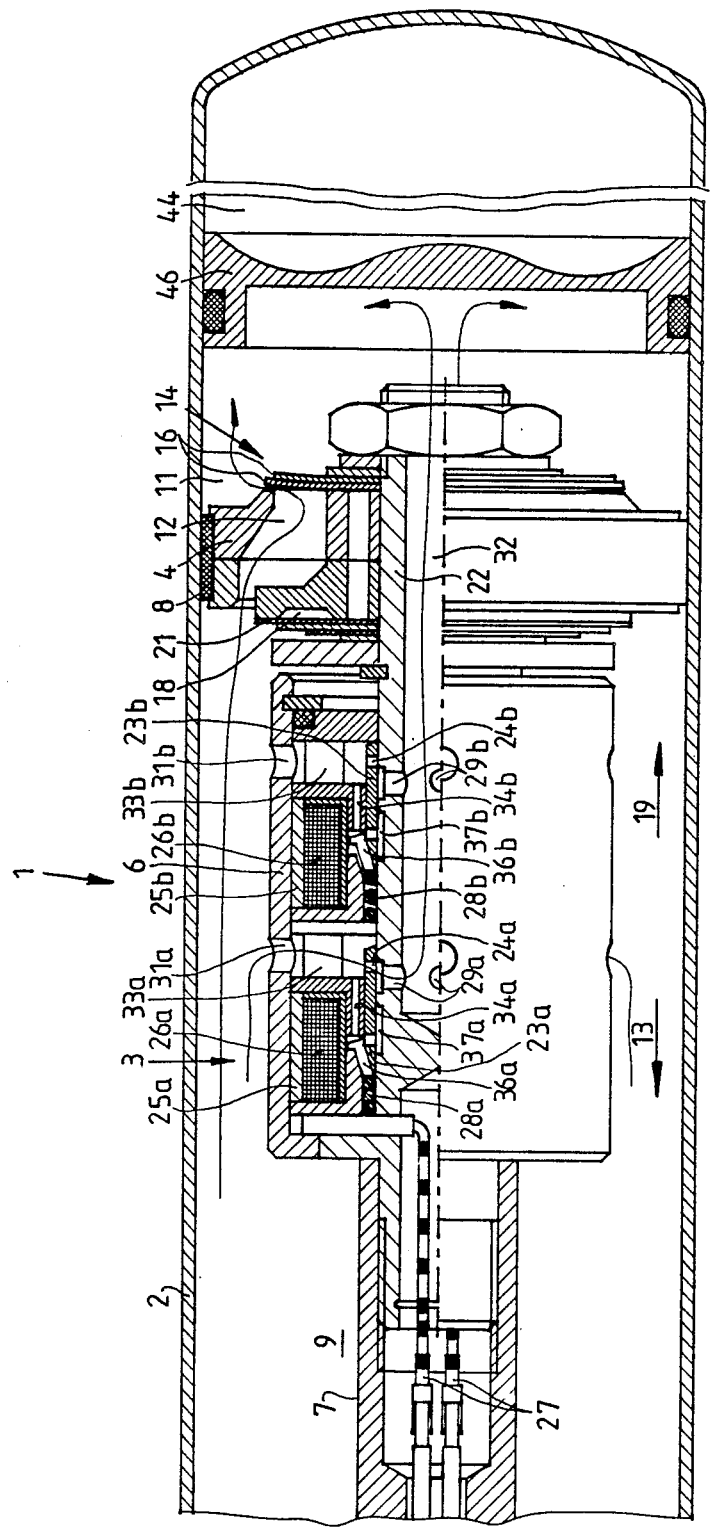
FIG. 1 is a fragmentary partly elevational and partly axial sectional view of a shock absorber which embodies one form of the invention and comprises two regulating valves, the valving element of one of the valves being shown in open and the valving element of the other valve being shown in closed position.
Figure 2:
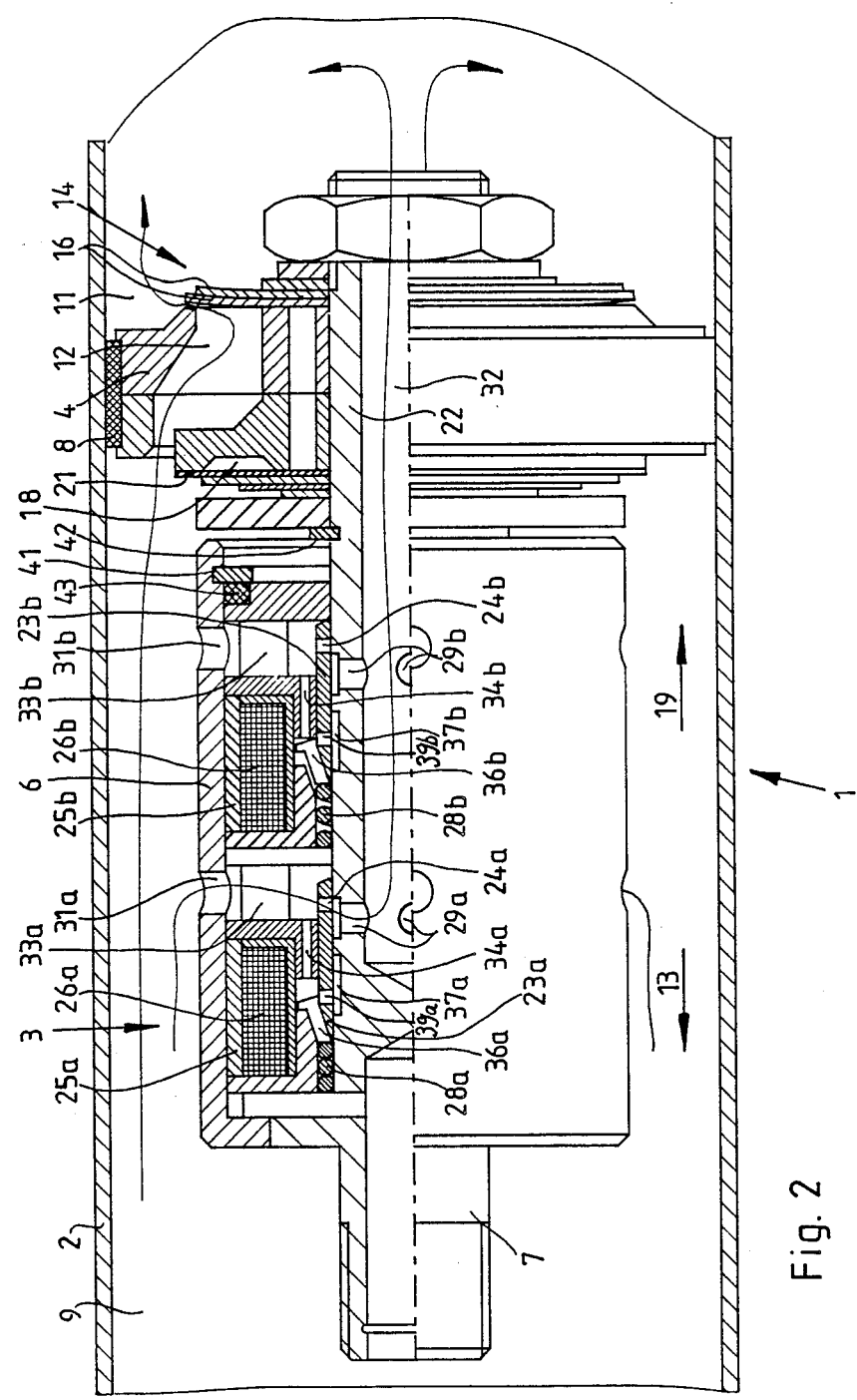
FIG. 2 is an enlarged view of a detail in the shock absorber of FIG. 1.

Referring first to FIGS. 1 and 2, there is shown a portion of a shock absorber 1. The means for installing the shock absorber in a motor vehicle or in another machine is of conventional design and has been omitted for the sake of clarity. The illustrated shock absorber 1 comprises an elongated hollow cylinder 2 and a novel and improved piston-piston rod assembly 3. The latter includes an elongated piston rod 7 which sealingly extends through the non-illustrated left-hand end wall of the cylinder 2, a piston 4 which divides the internal space of the cylinder 2 into two chambers 9 and 11, and an intermediate portion 6 which can be said to form part of the piston 4 or of the piston rod 7 and is disposed in the chamber 9. An annular sealing element 8 at the periphery of the piston 4 is in sealing engagement with the cylindrical internal surface of the cylinder 2. The chambers 9 and 11 contain a damping medium, preferably oil.

The piston 4 is formed with a first passage 12 which permits the damping medium to flow from the chamber 9 into the chamber 11 when the piston rod 7 is acted upon by a pulling force so that it moves the piston 4 in the direction of arrow 13. The passage 12 establishes a path for the flow of all or major quantity of damping medium into the chamber 11 when the piston 4 is caused to move in the direction of arrow 13. If desired or necessary, the piston 4 can be formed with two or more passages which serve to permit the damping medium to flow from the chamber 9 into the chamber 11. A check valve 14 is provided in the chamber 11 at the right-hand end of the illustrated passage 12 to prevent this passage from conveying damping medium from the chamber 11 into the chamber 9. The valve 14 comprises one or more resilient leaves 16 which normally bear against the respective end face of the piston 4 but yield in response to pressure of damping medium in the passage 12 when the piston rod 7 is caused to move in the direction of arrow 13.

The piston 4 is further formed with one or more passages 18 which permit the bulk or all of the damping medium to flow from the chamber 11 into the chamber 9 when the piston rod 7 is pushed in the direction of arrow 19 so as to move the piston 4 toward the right-hand end wall of the cylinder 2. The left-hand end of each passage 18 is adjacent a check valve 21 which can be identical with the check valve 14 and serves to prevent flow of damping medium from the chamber 9, into the passage 18 and thence into the chamber 11 when the piston rod 7 moves in the direction of arrow 13.

The assembly 3 further includes a cylindrical seat 22 which is common to the cylindrical axially movable valving elements 23a, 23b of two regulating valves each of which controls the flow of damping medium through a discrete bypass extending between the chambers 9 and 11. The valving element 23a has four equally spaced apertures 24a (only one can be seen in each of FIGS. 1 and 2) which are spaced apart from each other in the circumferential direction of the seat 22 and can be moved into an out of register with corresponding apertures 29a in the seat. The valving element 23b is preferably identical with the valving element 23a except that its apertures 24b can be smaller or larger than the apertures 23a to thus enhance the versatility of the regulating means including the seat 22 of the assembly 3 and the valving elements 23a, 23b. These valving elements are made of or contain a ferromagnetic material and are concentrically surrounded by discrete exciter coils 26a, 26b, respectively. The means for connecting the coils 26a, 26b with an energy source as well as with suitable control switches (not shown) include conductors 27 which extend through the hollow piston rod 7. The intermediate portion 6 of the assembly 3 further comprises ferromagnetic rings 25a, 25b which respectively surround the coils 26a, 26b and, in turn, are surrounded by the cylindrical jacket of the intermediate portion 6.

The valving element 23a is biased to one of its end positions by a coil spring 28a which surrounds the seat 22 and reacts against the intermediate portion 6 of the assembly 3. A similar or identical coil spring 28b is provided to bias the valving element 23b to one of its end positions, for example, to the closed or sealing position wherein the valving element 23b prevents any flow of damping medium between the chambers 9, 11 by way of the corresponding bypass. When the coil 26a or 26b is energized, it causes the respective valving element 23a or 23b to slide along the peripheral surface of the seat 22 and to move its apertures 24a or 24b to positions of more or less pronounced alignment with the respective apertures 29a or 29b of the seat 22. FIGS. 1 and 2 show the valving element 23a in open position (its apertures 24a register with the respective apertures 29a of the seat 22) and the valving element 23b in closed or sealing position in which the apertures 24b are out of register with the respective apertures 29b of the seat 22.

When the piston rod 7 is caused to move in the direction of arrow 13 while the coil 26a is energized to maintain the valving element 23a in open or at least partly open position (against the opposition of the coil spring 28a), damping medium flows from the chamber 9 into the chamber 11 primarily by way of the passage or passages 12 (such medium opens the check valve or valves 14). In addition, a selected quantity of damping medium flows from the chamber 9 into the chamber 11 by way of the bypass which is controlled by the valving element 23a. This bypass includes an axial blind bore or hole 32 which is provided in the seat 22 of the assembly 3 and whose open end communicates with the chamber 11, the radial apertures 29a in the seat 22, the apertures 24a of the valving element 23a, the apertures of a distancing element 33a in the intermediate portion 6, and apertures 31a in the jacket of the intermediate portion 6.

If the damping action of the shock absorber 1 (during movement of the piston rod 7 in the direction of arrow 13) is to be reduced, the coil 26b is energized in addition to the coil 26a so that the valving element 23b permits damping medium to flow through the corresponding bypass which includes the bore or hole 32, the apertures 29b of the seat 22, the apertures 24b of the valving element 23b, the apertures of a second distancing element 33b in the intermediate portion 6, and apertures 31b in the jacket of the intermediate portion. The apertures 31a and 31b communicate with the chamber 9.

If the piston rod 7 is to offer maximum resistance to a movement in the direction of arrow 13 (i.e., if the cylinder 2 is to offer maximum resistance to movement in the direction of arrow 19), the coils 26a and 26b are deenergized so that the damping medium then flows only by way of the passage or passages 12 because the valving elements 23a, 23b seal the respective bypasses.

Those end portions of the valving elements 23a, 23b which are adjacent the respective springs 28a, 28b resemble hollow conical frusta and their peripheral surfaces are preferably provided with shallow recesses or grooves 36a, 36b to permit the damping medium to flow into and from the compartments for the springs during energization or deenergization of the respective coils 26a, 26b. The grooves 36a, 36b permit the damping medium to escape from the respective compartments when the coils are energized so that the valving elements cause the springs to store energy, and these grooves permit the damping medium to flow into the compartments when the coils are deenergized and the springs are permitted to dissipate energy while moving the respective valving elements to their closed or sealing positions.

When the piston rod 7 is caused to move in the direction of arrow 19 (and/or the cylinder 2 is caused to move in the direction of arrow 13), the bulk of damping medium flows from the chamber 11 into the chamber 9 by way of the passage or passages 18 (the valve or valves 14 are then closed and the valve or valves 21 are then open), and a selected quantity of damping medium can flow from the chamber 11 into the chamber 9 by way of one or both bypasses, depending upon whether the coil 26a or 26b is energized. The damping medium flows only along the path which is defined by the passage or passages 18 if each of the two coils 26a, 26b is deenergized while the piston rod 7 moves in the direction of arrow 19.

As mentioned above, the cross-sectional area of the path which is defined by one of the bypasses need not be identical with that of the path which is defined by the other bypass. This renders it possible to achieve a wide range of regulations of the flow of damping medium between the chambers 9 and 11 in addition to the flow of medium through the passage(s) 12 or 18. Thus, the flow of additional damping medium is reduced to zero if the coils 26a, 26b are deenergized, the rate of flow of additional damping medium is increased to a maximum value in response to energization of both coils, the rate of flow of additional damping medium assumes a first intermediate value in response to energization of the coil 26a, and such rate assumes a different second intermediate value in response to energization of the coil 26b. The shock absorber is relatively "hard" if the flow of additional damping medium is interrupted or when only one of the coils 26a, 26b is energized, and the shock absorber is relatively "soft" if each of the two coils is energized.

The number of valving elements can be reduced to one or increased to three or more without departing from the spirit of the invention.

FIG. 2 further shows a split ring 41 which is adjacent an O-ring 43 and extends into an internal groove of the jacket of the intermediate portion 6 of the assembly 3 to maintain the parts in the portion 4 in assembled condition. A second split ring 42 is recessed into a circumferential groove of the seat 22 and cooperates with a nut at the right-hand end of the piston rod 7 to maintain the piston 4 in a selected axial position on the piston rod. The O-ring 43 can compensate for minor tolerances.

The chamber 11 is separated from a plenum chamber 44 by a partition 46 which is sealingly installed in the cylinder 2. The chamber 44 is filled by a pressurized gaseous fluid. Such fluid expands and contracts in response to axial movement of the partition 46 in order to compensate for the fact that the bulk of that portion of the piston rod 7 which extends into the chamber 9 varies in response to movement in the direction of arrow 13 or 19.

In accordance with a feature of the invention, the shock absorber 1 is further provided with means for supplying a lubricant (preferably the damping medium or fluid which fills the chambers 9 and 11) to the locations where the valving elements 23a, 23b slide relative to the adjacent parts, especially along the peripheral surface of the seat 22 of the assembly 3. In accordance with a further feature of the invention the channels which are employed to supply damping medium for lubrication of the valving elements 23a, 23b and seat 22 form part of the bypasses and vice versa. The films of damping medium between the seat 22 and the valving elements 23a, 23b reduce or eliminate friction and hydrostatically relieve the valving elements even if the pressure of the damping medium is high or extremely high. When the piston rod 7 is pulled in the direction of arrow 13, the damping medium flows or tends to flow from the apertures 31a, 31b toward the bore or hole 32 in the seat 22, and such medium bears upon the external surfaces of the valving elements 23a, 23b to urge them against the peripheral surface of the seat 22. In order to reduce friction between the valving elements 23a, 23b and the seat 22, the supplying means delivers damping medium (lubricant) between the valving elements and the seat. Such lubricant is to form a thin hydrostatic film which ensures that energization or deenergization of the coil 26a and/or 26b will result in highly predictable movement of the respective valving element between its two end positions. The film can develop because the damping medium can flow from the chamber 9, through the apertures 31a, 31b in the jacket of the intermediate portion 4 of the piston-piston rod assembly 3, through the apertured distancing elements 33a, 33b, through bores 34a, 34b in the rings 25a, 25b, as well as holes or bores 39a, 39b in the valving elements 23a, 23b. Such damping medium fills the shallow peripheral grooves 37a, 37b of the seat 22. The just described lubricant supplying means has been found to greatly enhance the predictability and reliability of regulation of the flow of damping medium between the chambers 9 and 11 by way of the bypasses which are controlled by the valving elements 23a, 23b. Thus, the valving elements can react more rapidly to energization of the respective coils as well as to deenergization of the coils, i.e., to the bias of the respective springs 28a, 28b.

The lubricant supplying means can further ensure a more predictable operation of the regulating means when the piston rod 7 is caused to move in the direction of arrow 19. The lubricant (damping medium) again forms a film between the seat 22 and the valving elements 23a, 23b by bearing against the internal surfaces of the valving elements in the region of the apertures 29a, 29b in the seat 22.

Figure 3:
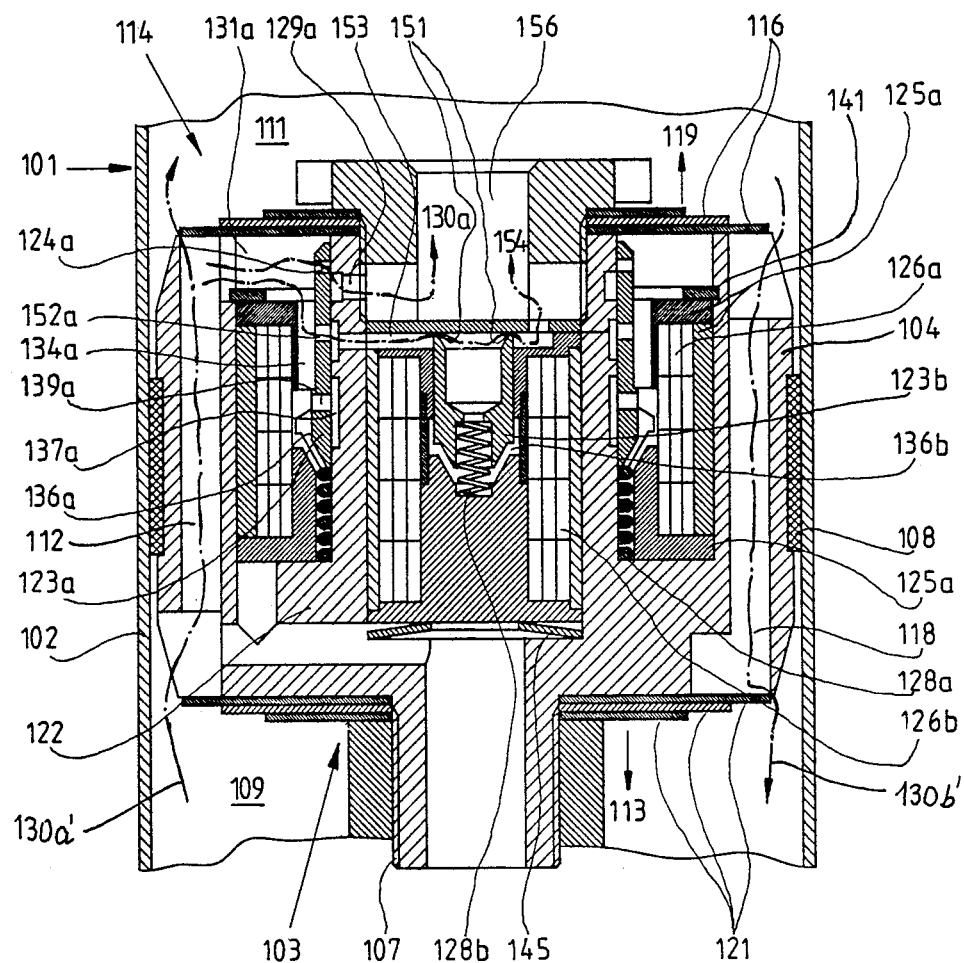
FIG. 3 is a fragmentary axial sectional view of a second shock absorber wherein one of the regulating valves is surrounded by the other regulating valve.

FIG. 3 shows a portion of a second shock absorber 101. Those component parts of this shock absorber which are identical with or clearly analogous to the corresponding parts of the shock absorber 1 are denoted by similar reference characters plus 100. The main difference between the shock absorbers 1 and 101 is that, in the shock absorber 101, an annular outer valving element 123a of the means for regulating the flow of damping medium through the bypasses concentrically and spacedly surrounds an inner valving element 123b which is coaxial with the piston-piston rod assembly 103. The latter again comprises a piston 104 having an annular sealing element 108 which sealingly engages the internal surface of the cylinder 102 so as to divide the internal space of the cylinder into two chambers 109 and 111. The intermediate portion (6 in FIGS. 1 and 2) of the assembly 3 is omitted because the exciter coils 126a, 126b of the regulating means and the coil springs 128a, 128b for the respective valving elements 123a, 123b are installed directly in the piston 104. The chambers 109, 111 are filled with oil or another suitable damping medium.

The piston 104 is formed with at least one passage 112 for the flow of the bulk of damping medium from the chamber 109 into the chamber 111 when the piston rod 107 is caused to move in the direction of arrow 113 (or when the cylinder 102 is caused to move in the direction of arrow 119), and each passage 112 is controlled by a check valve 114 having one or more resilient leaves which block the flow of damping medium from the chamber 111 into the chamber 109. The leaves are shown at 116. When the piston rod 107 is moved in the direction of arrow 119 (and/or the cylinder 102 moves in the direction of arrow 113), the bulk or all of the damping medium flows from the chamber 111 into the chamber 109 by way of one or more passages 118 each of which is controlled by a check valve having resilient discs 121 which prevent the damping medium from flowing from the chamber 109 into the passage or passages 118.

The assembly 103 includes a seat 122 which is a hollow cylinder surrounding the valving element 123b and being surrounded by the valving element 123a. The latter has an annulus of preferably equally spaced apertures 124a which form part of the respective bypass. The exciter coil 126a concentrically surrounds the outer valving element 123a and is connected to the energy source and to the controls by conductor means (not shown) extending from the shock absorber 101 by way of the interior of the hollow piston rod 107. This exciter coil is surrounded by a ferromagnetic ring 125a. The valving element 123a also consists of or contains a ferromagnetic material and is moved downwardly (as seen in FIG. 3) against the opposition of the coil spring 128a when the coil 126a is energized whereby the apertures 124a move into partial or full register with the respective apertures 129a in the seat 122. FIG. 3 shows the valving element 123a in the closed or sealing position in which the apertures 124a are sealed from the apertures 129a, i.e., the coil 126a is not energized. When the coil 126a is energized and maintains the valving element 123a in open position, a certain quantity of damping medium can flow from the chamber 109 into the chamber 111 by way of the bypass including one or more channels 131a in the piston 104, apertures 124a in the valving element 123a, apertures 129a in the seat 122 and an axially extending blind bore or hole 156 in the seat. The bulk of damping medium flows from the chamber 109 into the chamber 111 by way of the passage or passages 112 through the respective check valve or valves 114 which are then open in response to pressure of damping medium in the channel(s) 112. The direction of flow of the main stream of damping medium from the chamber 109 into the chamber 111 in response to movement of the piston rod 107 in the direction of arrow 113 is indicated by a phantom-line arrow 130a'.

The exciter coil 126b for the inner valving element 123b is disposed within the confines of the seat 122 and can be energized to shift the valving element 123b axially against the opposition of a coil spring 128b. The coil 126b is concentric with the coil 126a, valving element 123a and valving element 123b. That end portion of the valving element 123b which is remote from the spring 128b has a relatively sharp annular rim 151 serving to control the flow of damping medium along the path which is defined by the respective bypass. Such bypass includes the aforementioned channel or channels 131a in the piston 104, apertures 152a in the valving element 123a, channels 153 in the piston 104 and the bore or hole 156 in the seat 122. The stream of damping medium which can flow through the bypass controlled by the outer valving element 123a is shown at 130a, and the stream of damping medium which can flow through the bypass controlled by the inner valving element 123b is shown at 154. The positions and dimensions of apertures 152a in the outer valving element 123a are selected in such a way that these apertures permit the damping medium to flow between the channels 131a and 153 of the piston 104 in each axial position of the valving element 123a relative to the seat 122.

If only one of the coils 126a, 126b is energized, the damping medium can flow through the respective bypass in addition to the flow of damping medium through the passage(s) 112 or 118. The cross-sectional area of the path which is defined by one of the bypasses preferably exceeds or is less than the cross-sectional area of the path which is defined by the other bypass for reasons which were explained above in connection with the shock absorber 1 of FIGS. 1 and 2. When the coil 126a is energized simultaneously with the coil 126b, and the piston rod 107 moves in the direction of arrow 113, the chamber 109 receives the stream or streams 130a' as well as the streams 130a, 154 each of which enters the chamber 111 by way of the bore or hole 156 in the seat 122.

Those end portions of the valving elements 123a, 123b which are immediately adjacent the respective springs 128a, 128b constitute or resemble conical frusta which are provided with external grooves or recesses 136a, 136b serving to enable the damping medium to flow into and from the compartments for the respective springs. Thus, the grooves 136a, 136b permit damping medium to leave the respective compartments in response to energization of the coils 126a, 126b, and these grooves permit damping medium to flow back into the respective compartments in response to deenergization of the coils, i.e., when the springs 128a, 128b are permitted to dissipate energy and move the respective valving elements to their closed or sealing positions.

When the piston rod 107 is caused to move in the direction of arrow 119 (and/or when the cylinder 102 is caused to move in the direction of arrow 113), the bulk of damping medium flows from the chamber 111 into the chamber 109 by way of the passage(s) 118 in the direction indicated by arrow 130b'. If at least one of the coils 126a, 126b is energized, an additional stream of damping medium flows from the chamber 111 into the chamber 109 through the respective bypass, i.e., counter to the direction indicated by the arrow 130a or 154. At such time, the coil spring 128a or 128b stores energy which suffices to rapidly propel the valving element 123a or 123b back to the sealing or closed position as soon as the energization of the coil 126a or 126b is completed. The shock absorber 101 is "hard" when the coils 126a, 126b are deenergized so that the damping medium can flow only through the passage(s) 112 or 118, and this shock absorber is "soft" if the coils 126a, 126b are energized at the time the piston rod 107 moves in the direction of arrow 113 or 119 (and/or the cylinder 102 moves in the direction of arrow 119 or 113). The shock absorber 101 is neither very hard nor very soft when only one of the coils 126a, 126b is energized.

The shock absorber 101 can comprise a single valving element or three or more valving elements.

FIG. 3 further shows a split ring 141 which holds the ferromagnetic ring 125a for the coil 126a in the illustrated position, and a dished spring 145 which biases the ferromagnetic part of the regulating valve including the valving element 123b and the coil 126b.

The shock absorber 101 also comprises means for supplying lubricant (preferably the damping medium) to the locations where the valving elements 123a, 123b slide relative to the adjacent parts, especially with reference to the seat 122. The aforementioned bypasses constitute parts or include such supplying means for the sake of simplicity and lower cost. When the piston rod 107 is caused to move in the direction of arrow 113, the highly pressurized damping medium in the chamber 109 acts upon the external surface of the outer valving element 123a. The pressure of damping medium is communicated to the valving element 123a by way of the channel or channels 131a, and the valving element 123a has one or more apertures 134a which admit damping medium into a shallow recess 137a in the peripheral surface of the seat 122 to facilitate the establishment of a hydrostatic film between the seat and the valving element 123a. The ring-shape member 125a has one or more axially parallel bores or holes 134a which can be said to constitute portions of the means for supplying lubricant (damping medium) into the recesses 137a. The film of damping medium or lubricant between the valving element 123a and the seat 122 ensures that the axial movements of the valving element 123a are highly predictable when the coil 126a is energized or deenergized, i.e., when this valving element is compelled to move axially as a result of energization of the coil 126a or when the coil spring 128a is permitted to dissipate energy in response to deenergization of the coil 126a.

When the piston rod 107 is compelled to move in the direction of arrow 119, the hydrostatic film between the external surface of the seat 122 and the internal surface of the outer valving element 123a is established by damping medium which penetrates, at an elevated pressure, into the apertures 129a of the seat 122 by flowing from the chamber 111 into and beyond the bore or hole 156. Thus, the shock absorber 101 establishes a hydrostatic film between the valving element 123a and the seat 122 whenever the pressure in the chamber 109 or 111 rises. This ensures that the valving element 123a immediately and predictably moves to the sealing position in response to deenergization of the coil 126a and that this valving element immediately and predictably leaves the sealing position when the coil 126a is energized.

The channel 153 ensures the development of a film of damping medium between the valving element 123b and the internal surface of the seat 122 irrespective of whether the damping medium flows in or counter to the direction which is indicated by the arrow 154.

An advantage of the shock absorber 101 is that the means for regulating the flow of damping medium through the two bypasses occupies little room in the axial direction of the cylinder 102. This is due to the fact that the valving element 123a and the coil 126a concentrically surround the valving element 123b and the coil 126b. It will be noted that the passage or passages 112, 118 are disposed between the internal surface of the cylinder 102 and the exciter coil 126a for the outer valving element 123a. This also contributes to compactness of the shock absorber 101. The shock absorber 101 is less expensive than the shock absorber 1 because the means for regulating the flow of damping medium through the bypasses and the means for supplying damping medium (or a separate lubricant) between the seat 122 and the valving element 123b and/or 123a are installed in the piston 104 so that the intermediate portion 6 of the piston-piston rod assembly 3 can be dispensed with.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A shock absorber with a variable damping characteristic, particularly for use in vehicles, comprising at least one hollow cylinder defining an internal space for confinement of a damping fluid and having a first and a second end; a piston-piston rod assembly including a piston rod sealingly extending through one of said ends and into said cylinder, and a piston disposed in and being in sealing engagement with said cylinder so as to divide said internal space into first and second chambers, said assembly having at least one passage for the flow of damping fluid between said chambers and said assembly further having a plurality of bypasses extending between said chambers; and means for regulating the flow of damping fluid through said bypasses, including a valving element for each bypass and an exciter coil for each valving element, said valving elements being concentric with each other and each valving element being mounted in said assembly for sliding movement with reference to said assembly and relative to the respective bypass, said assembly and said valving elements having closely adjacent confronting surfaces and said assembly further having hydrostatic bearing means including means for continuously supplying a lubricant between said valving elements and said assembly, said lubricant supplying means including at least one annular groove provided in one of said confronting surfaces.

2. The shock absorber of claim 1, wherein the lubricant is said damping fluid.

3. The shock absorber of claim 1, wherein said regulating means is electrically operated and said assembly includes seat means for said valving elements, said supplying means being arranged to supply lubricant between said valving elements and said seat means.

4. The shock absorber of claim 3, wherein said seat means includes a single seat which is common to all of said valving elements.

5. The shock absorber of claim 4, wherein said single seat includes a cylinder.

6. The shock absorber of claim 1, wherein each exciter coil concentrically surrounds the respective valving element.

7. The shock absorber of claim 1, wherein said coils are concentric with each other, with said valving elements and with said assembly.

8. The shock absorber of claim 1, wherein said valving elements include an inner valving element and an outer valving element which surrounds said inner valving element.

9. The shock absorber of claim 8, wherein said at least one passage is provided in said assembly radially outwardly of said outer valving element.

* * * * *